United States Patent
Arataki et al.

(10) Patent No.: US 7,480,850 B2
(45) Date of Patent: Jan. 20, 2009

(54) METHOD OF WRITING DATA AND CHANNEL ADAPTER

(75) Inventors: Nina Arataki, Kawasaki (JP); Sadayuki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 11/085,540

(22) Filed: Mar. 22, 2005

(65) Prior Publication Data

US 2006/0129901 A1 Jun. 15, 2006

(30) Foreign Application Priority Data

Dec. 10, 2004 (JP) ............................. 2004-358143

(51) Int. Cl.
*H03M 13/00* (2006.01)

(52) U.S. Cl. ...................... 714/779; 714/763

(58) Field of Classification Search ................. 714/776, 714/758, 751, 779, 763
See application file for complete search history.

(56) References Cited

U.S. PATENT DOCUMENTS

| | | | |
|---|---|---|---|
| 5,506,979 A * | 4/1996 | Menon ........................ | 711/112 |
| 5,581,360 A * | 12/1996 | Matsumura et al. ........... | 386/46 |
| 5,640,506 A * | 6/1997 | Duffy .......................... | 714/6 |
| 5,717,956 A * | 2/1998 | Shinosaka et al. ............. | 710/65 |
| 5,844,918 A * | 12/1998 | Kato ........................... | 714/751 |
| 5,890,206 A * | 3/1999 | Koike .......................... | 711/112 |
| 6,195,761 B1 * | 2/2001 | Kedem .......................... | 714/6 |
| 6,389,511 B1 * | 5/2002 | Kedem .......................... | 711/114 |
| 6,449,394 B1 * | 9/2002 | Florencio .................... | 382/246 |
| 6,470,421 B1 * | 10/2002 | Bui et al. .................... | 711/114 |
| 6,535,994 B1 * | 3/2003 | Kedem .......................... | 714/6 |
| 6,697,817 B2 * | 2/2004 | Muraoka .................... | 707/102 |
| 6,782,444 B1 * | 8/2004 | Vishlitzky et al. ............. | 711/4 |

FOREIGN PATENT DOCUMENTS

| | | |
|---|---|---|
| JP | 2000-105675 | 4/2000 |
| JP | 2001-325156 | 11/2001 |
| JP | 2002-7224 | 1/2002 |
| JP | 2002-55862 | 2/2002 |
| JP | 2003-36146 | 2/2003 |

* cited by examiner

*Primary Examiner*—M. Mujtaba K Chaudry
(74) *Attorney, Agent, or Firm*—Staas & Halsey LLP

(57) ABSTRACT

A method of writing data includes receiving a record of a variable-length data format, creating a field-checking code for each field of the record received, creating a block-checking code in units of the fixed-length data for the data received, and writing data by reading the record, assembling fixed length data that includes the field-checking code and the block-checking code by using the field-checking code and the block-checking code, and transferring the data to a cache memory.

13 Claims, 11 Drawing Sheets

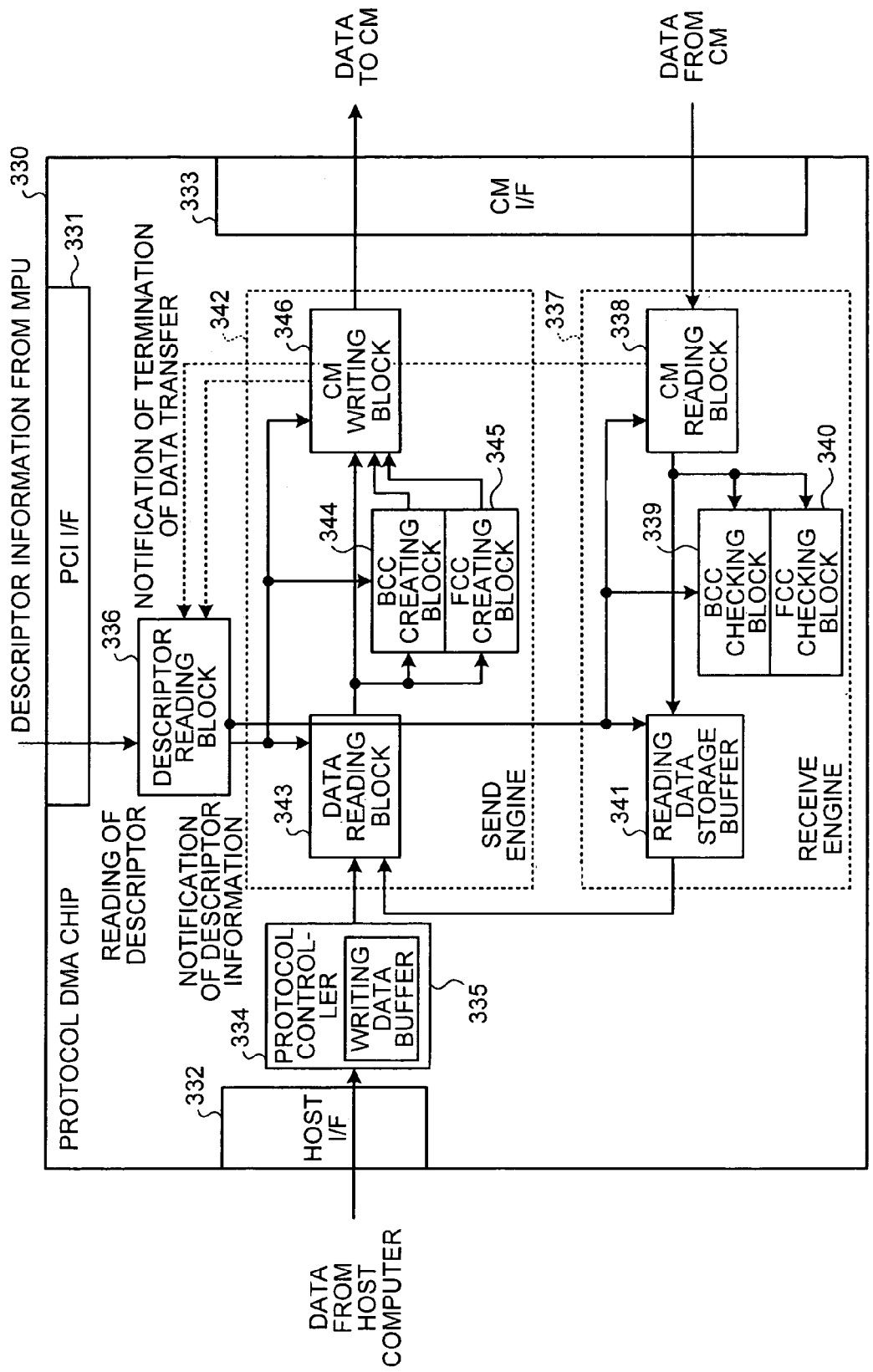

PRIOR ART

METHOD OF WRITING DATA AND CHANNEL ADAPTER

BACKGROUND OF THE INVENTION

1) Field of the Invention

The present invention relates to a method of writing recording data that has a variable-length data format in a data-storage unit that processes data in a fixed-length format, and a channel adapter that executes the method of writing.

2) Description of the Related Art

In a main-frame system that runs on vendor's own operating system, a magnetic-disc unit that has a data format of variable-length records has been used as an external storage unit. In the data format of variable-length records, a record includes three fields viz, a count, a key, and data and is called as CKD (count, key, data) format. In the CKD format, one data is managed as a unit of one record.

On the other hand, a disc array unit (also called as RAID (Redundant Arrays of Inexpensive Disks) has been used a lot as the external storage unit that is used in an information processing system. The disc array unit has a structure that enables a high-speed data access and an improved fault-resistance of data. The disc array system being used a lot in an open system that is operated by a general purpose operating system of different type, has a data format of a fixed-length record. For example, in a normal disc-access unit, data is stored according to a logical block where one logical block includes 512 bytes.

In recent years, with the progress in information processing technology, information-processing terminals have become prevalent, and in many cases the information-processing system is built by mixing a main-frame system and an open system. Therefore, in the disc array unit that stores data in a data format of fixed length, a unit with a configuration that enables data access even from the main-frame system, has been proposed in Japanese Patent Application Laid-open Application No. 2002-55862.

However, while storing the data in the external storage unit, when the data that is stored is to be read again, an error-checking code for judging if there is an error is attached to the data. For example, in a CKD format of the main-frame system, an error check is performed for each field that is included in the record and a code that indicates result of the error check is attached to a tail end of the field. Moreover, in the fixed-length data format of the open system, the error check is performed for each logical block and a code that indicates result of the error check is attached to a tail end of the logical block.

FIG. 11 is a schematic diagram of a data structure in which the block-checking code is attached for each logical block that is used in the open system. Logical blocks 110A to 110C include data sections 115A to 115C and block-checking codes 120A to 120C of predetermined lengths added to the data sections 115A to 115C. At this point, a request for update of data 150 that includes the three logical blocks 110A to 110C is made. When the request is made, content of data of the logical blocks 110A and 110C is let to be updated, but due to some fault, content of data of the logical block 110B is not let to be updated and the data of the logical block 110B is as it is without any change. If data 150 of the logical blocks 110A to 110C is read, even if the error check is performed, since the block-checking code 120A and 120C of the logical blocks 110A and 110c that are updated and the block-checking code 120B of the logical block 110B that is not updated are correct, a fault that the logical block 110B was not updated, cannot be detected. In the main-frame system, if data that was supposed to be updated similarly could not be updated in units of fields, the fault cannot be detected.

SUMMARY OF THE INVENTION

It is an object of the present invention to at least solve the problems in the conventional technology.

According to an aspect of the present invention, a method of writing data in which a record of a variable-length data format is written according to instructions form an external unit, in a storage unit that manages by fixed-length data the record of the variable-length data format that includes a predetermined field includes receiving a record of the variable-length data format; creating a field-checking code for each field of the record received; creating a block-checking code in units of the fixed-length data for the record received; and writing data by reading the record, assembling fixed-length data that includes the field-checking code and the block-checking code by using the field-checking code and the block-checking code, and transferring the data to the storage unit.

According to another aspect of the present invention, a method of writing data in which a record in a storage unit is updated according to instructions from an external unit in the storage unit that manages by fixed-length data the record of the variable-length data format that includes a predetermined field includes receiving a record of an updated variable-length data format; reading fixed length data from the storage unit that corresponds to the received record; reading data in which for an update field that includes a content that is updated, the data is read from the record that is received and for a field other than the update field, the data is read from the data subjected to updating; check-code creating by calculating a field-checking code in units of field for the update field as well as calculating a block-checking code in units of a length of the fixed-length data, and calculating the block-check field in units of the length of the fixed-length data for a field other than the update field; and writing data by assembling the data that is read in the reading data and fixed-length data that includes the field-checking code and the block-checking code, by using the field-checking code and the block-checking code created in the checking the code, and transferring the data to the storage unit.

According to still another aspect of the present invention, a channel adapter that writes and reads data, according to instructions from an external unit, in and from a storage unit that manages a record in a variable-length data format including a predetermined field, by fixed-length data includes a data processing unit that creates a descriptor for writing the record in the storage unit upon receiving the request for writing a record in the variable-length data format and receiving the record; a writing data storage unit that stores the record received; and a data sending unit that has a data reading function of reading the record from the writing data storage unit based on the descriptor, an FCC creating function of creating a field-checking code for each field in the record that is read, a BCC creating function of creating a block-checking code in units of the fixed-length data for the record that is read, and a data writing function that includes assembling fixed-length data that includes the field-checking code as well as the block-checking code, by using the data read by the data reading function, the field-checking code created by the FCC creating function, and the block-checking code created by the BCC creating function, transferring the data in the storage unit to thereby writing the data in the storage unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a block diagram of a functional configuration of a protocol DMA chip;

DETAILED DESCRIPTION

Exemplary embodiments of the present invention are described below with reference to the accompanying diagrams.

In the method of writing data according to a first embodiment of the present invention, a management of data is performed by storing data in a data format of variable length in a fixed-length data format. The method of writing data can be applied to a storage unit (memory for data-storage) that can deal with an access to fixed-length data as well as an access to variable-length data. In the following description, the method of writing data and the channel adapter that performs reading and writing from and in a cache memory in a disc array unit as a unit to execute the method of writing are described.

Figure 1:
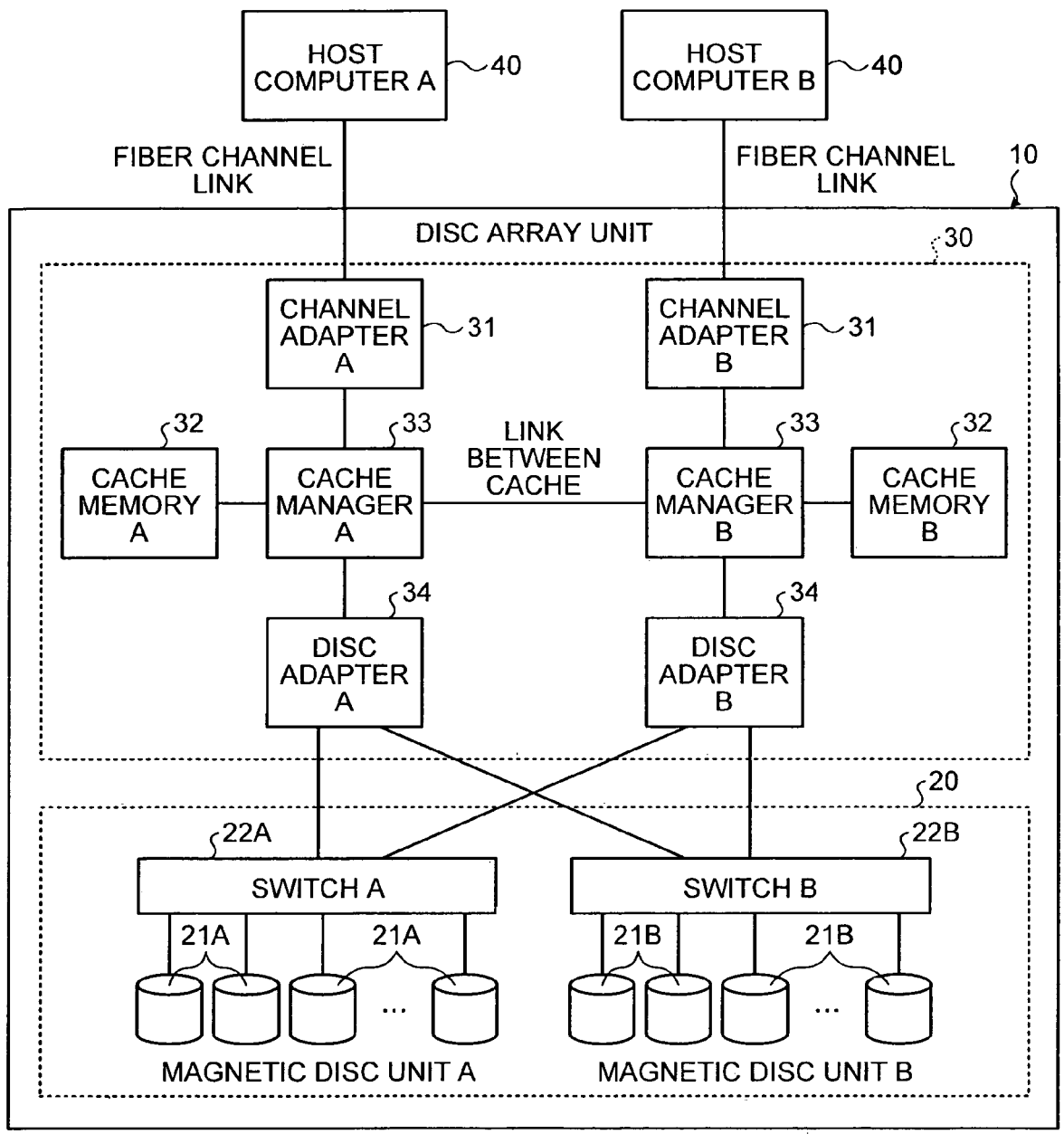
FIG. 1 is a schematic block diagram of a configuration of a disc array unit.

FIG. 1 is a schematic block diagram of a configuration of a disc array unit 10 according to a first embodiment of the present invention. The disc array unit 10 functions as an external storage unit of a plurality of host computers 40 and includes a disc array section 20 that stores data and a disc array controller 30 that controls the disc array section 20. The host computers 40 are external units.

The disc array section 20 includes magnetic disc units 21A and 21B, and switches 22A and 22B that switch the magnetic disc units 21A and 21B. The magnetic disc units 21A and 21B have structure that differs according to a level of RAID (Redundant Array of Inexpensive Discs), which is normally classified according to a speed of data access and a degree of redundancy of data. An application of each of the magnetic disc unit is classified according to a level of the RAID such as a magnetic disc unit for storing data, a magnetic disc unit for mirroring data that is stored in the magnetic disc, and a magnetic disc for storing parity data that is created for the data stored in the magnetic disc unit. The magnetic disc units 21A and 21B store data in a data format of a fixed length.

The disc array controller 30 includes a channel adapter 31, a cache memory 32, a cache manager 33, and a disc adapter 34. The channel adapter 31 performs an interface control of the host computer 40. The cache memory 32 stores temporarily data that is read from the magnetic disc units 21A and 21B. The cache manager 33 performs various controls during the reading and writing the data and a control of the cache memory 32. The disc adapter 34 performs control of the magnetic disc units 21A and 21B based on instructions from the cache manager 33 during reading and writing the data.

The cache manager 33 has a function of enabling the channel adapter 31 to read by reading data from the magnetic disc units 21A and 21B and put it in the cache memory 32, when data for which there is a request to read from the host computer 40 is not there in the cache memory 32. If a capacity of the cache memory 32 is saturated, data that is not used or data for which a predetermined period of time has elapsed after an access was made for the last time, is disposed of and an area for writing new data is secured. Moreover, the cache manager 33 has a function of giving instructions to the disc adapter 34 to write in the magnetic disc units 21A and 21B data that is written in the cache memory 32 by a request for writing from the host computer 40.

The cache memory 32 has functions such as storing data that is read from the magnetic disc units 21A and 21B by the cache manager and storing data for which there is a request to write from the host computer 40. The disc adapter 34 has functions such as reading data from the magnetic disc units 21A and 21B and writing data in the magnetic disc units 21A and 21B based on the instructions from the cache manager 33. The cache memory 32 is a memory for storing data.

The channel adapter 31 has functions such as reading from the cache memory 32 data that correspond to the request for reading from the host computer 40, transferring that data to the host computer 40, as well as writing in the cache memory 32 the data for which there is a request for writing from the host computer 40.

The method of writing data according to the present invention can be used for writing data between the channel adapter 31 and the cache memory 32. For this purpose, a check code and a conversion of format while transferring the data between the channel adapter 31 and the cache memory 32 are described below. To start with, the data is let to be managed in logical block of a fixed length at the magnetic disc units 21A and 21B. The fixed length is assumed to be 512 bytes for the sake of explanation.

Figure 2:
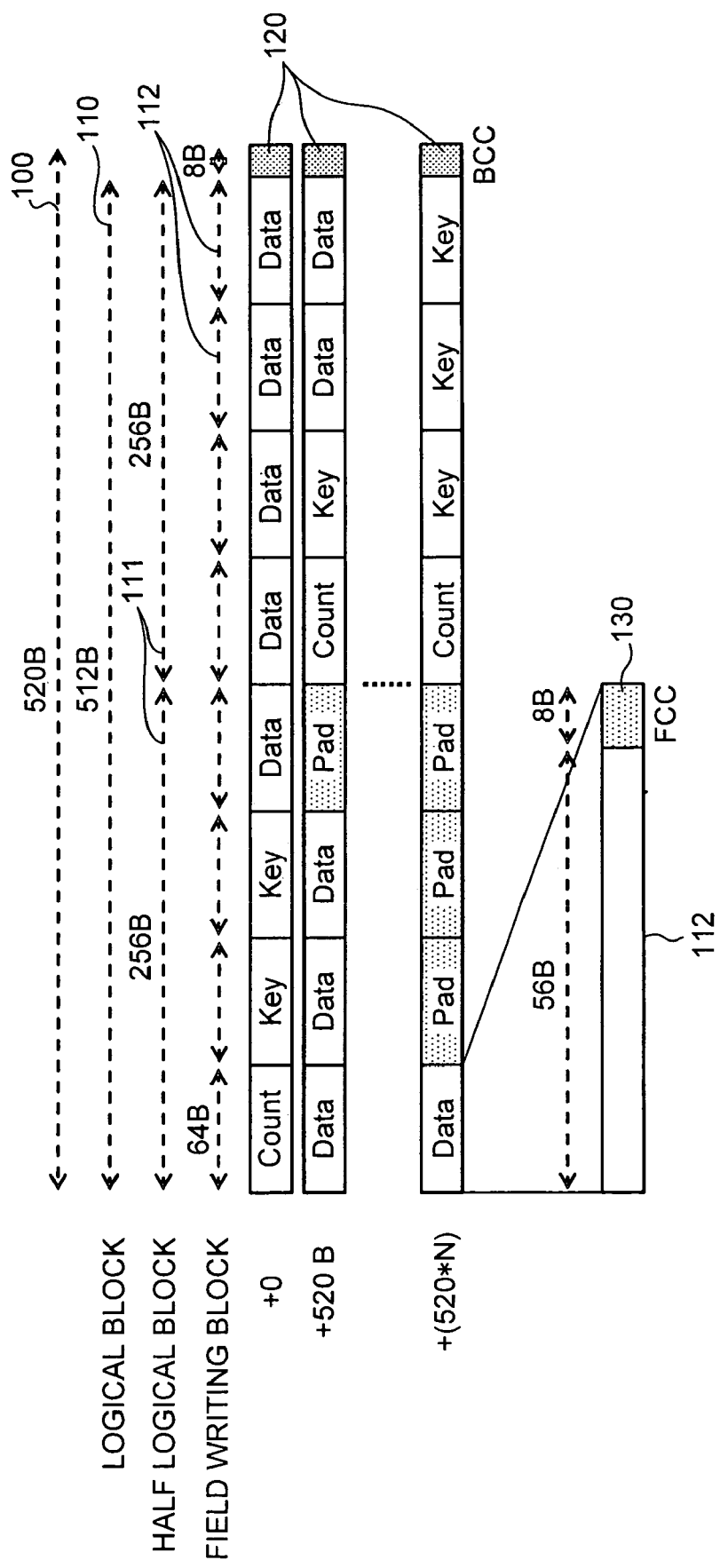
FIG. 2 is a schematic diagram of a structure of data that is managed by a cache memory.

FIG. 2 is a schematic diagram of data that is managed by the cache memory. In the cache memory 32, for data that is read from the magnetic disc units 21A and 21B, data in which an 8 byte error-checking code (hereinafter, "block-checking code (BCC)") 120, which is a result of an error check performed for each logical block of 512 bytes, is attached after a logical block 110, is stored. In other words, in data 100 that is written in the cache memory 32 the block-checking code 120 of 8 bytes for an error protection for each logical block 110 of 512 bytes is added continuously and the overall data length becomes 520 bytes.

In the cache memory 32, the data is let to be managed in a half of a unit of the logical block 110, i.e. the data is managed with a fixed length of 256 bytes. The half of the unit of the logical block is to be called as a half logical block 111 hereinafter. Further, the half logical block 111 is divided into small blocks each of 64 bytes. Let the small blocks be called as a field writing block 112.

Figure 3:
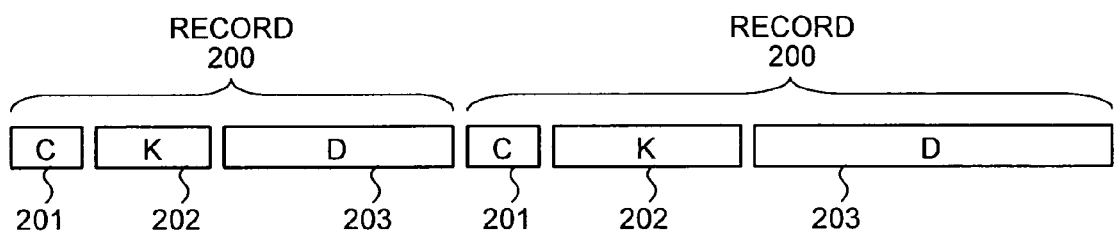
FIG. 3 is a schematic diagram of a structure of data in a CKD format.

Next, an arrangement for storing data of a variable-length data format in a fixed-length data format is described below. In this description, a CKD format is used as a variable-length data format. FIG. 3 is a schematic diagram of a structure of data in the CKD format. A record 200 in the CKD format includes a count section 201, a key section 202, and a data section 203. The count section 201 has a fixed length and includes information of a data length and an address of the record 200. The key section 202 has a variable length and is used for identifying the record 200 by an operating system. The data section 203 has a variable length and is an area in which user data is stored.

Thus, in the cache memory 32 since the data is managed in units of the half logical block 111, variable-length data (CKD data) is stored from a front end of the half logical block 111. Therefore, the record 200 of more than one variable-length data (CKD data) cannot be stored in the half logical block 111. Moreover, each of fields 201 to 203 of the record 200 is let to be written from a front end of the field writing block 112 in the half logical block 111 and two different fields from among the fields 201 to 201, for example the count section 201 and the key section 202, or the key section 202 and the data section 203 cannot be written in the same field writing block 112. Further, an error-checking code (hereinafter, "field-checking code (FCC)") 130 of 8 bytes that is calculated is written for each of the fields 201 to 203. The field-checking code 130 is let to be written in last 8 bytes of the field writing block 112.

It is desirable that the block-checking code 120 is a code in which a result that is obtained by a calculation by using all the data in the logical block 110, is created and it is desirable that the field-checking code 130 is a code in which a result that is obtained by calculating by using all the data in the fields 201 to 203, is created. According to the present specification, a Cyclic Redundancy Check is used as a method for checking an error and a Cyclic Redundancy Check code (hereinafter, "CRC") that is created by the Cyclic Redundancy Check is used as a code for checking. Moreover, according to the present specification, a CRC that is attached to each logical block 110 is called as BCC-CRC and a CRC that is attached to each of the fields 201 to 203 is called as FCC-CRC.

Figure 4:
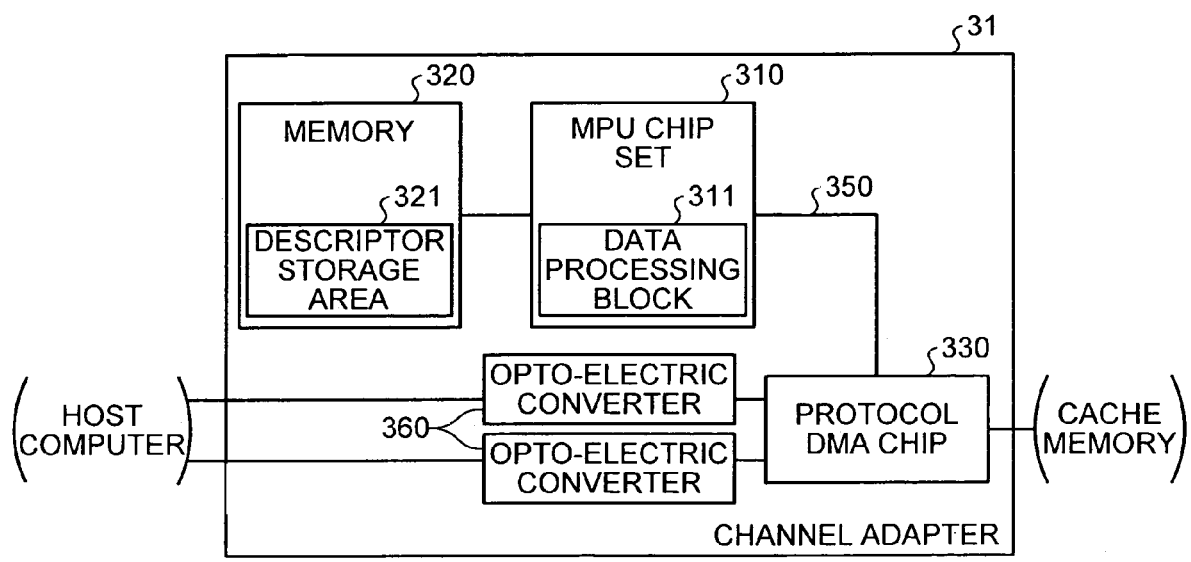
FIG. 4 is a block diagram of a functional configuration of a channel adapter.

Next, a configuration of the channel adapter 31 in the disc array unit 10 that executes the method of writing data according to the present invention is described below. FIG. 4 is a block diagram of a functional configuration of the channel adapter. FIG. 5 is a block diagram of a functional configuration of a protocol DMA chip in the channel adapter. The channel adapter 31 includes an MPU (Micro Processing Unit) chip set 310, a memory 320, and a protocol-DMA (Direct Memory Access) chip 330. The MPU chip set 310 and the protocol DMA chip 330 are connected by a PCI (Peripheral Component Interconnect) bus 35 and can mutually transfer data.

The MPU chip set 310 is an LSI (Large-Scale Integrated circuit) that includes a memory interface and a processor that performs operation control of the channel adapter 31. The MPU chip set 310 includes a data processing block 311 as a functional module related to the method of writing data. The data processing block 311 has a function of creating a descriptor that is required while updating and writing newly in the cache memory 32 data that has the CKD format. For example, the data processing block 311 has the function of creating a descriptor that writes the data in the CKD format and a function of acquiring updated information about a field that is updated in updated data by exchanging information about data between the cache memory 32 and the host computer 40 before receiving the updated data in the CKD format, as well as creating a descriptor for executing a data-updating process (hereinafter, "ReadModifyWrite process") based on updated information and updated data that are received. The data processing block 311 is a data processing unit. The descriptor includes a procedure necessary for executing a data access by the protocol DMA chip 330, described in it.

Figure 6A:
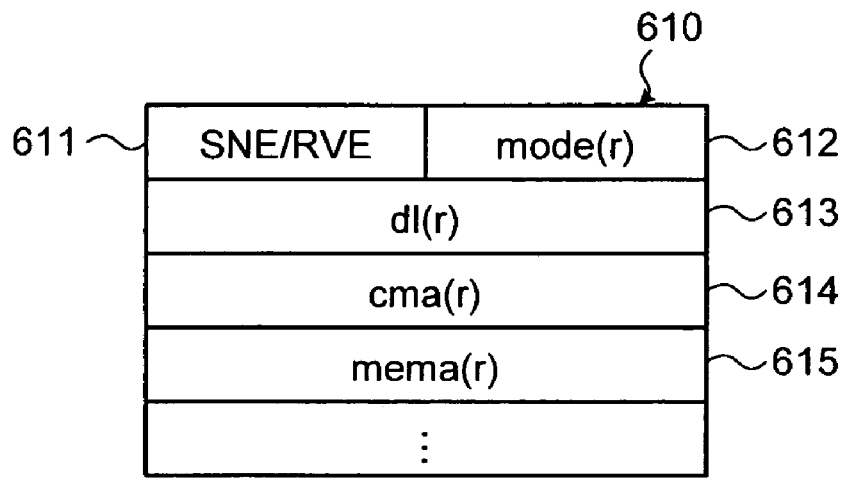
FIG. 6A is a diagram of a configuration of a descriptor for data reading.
Figure 6B:
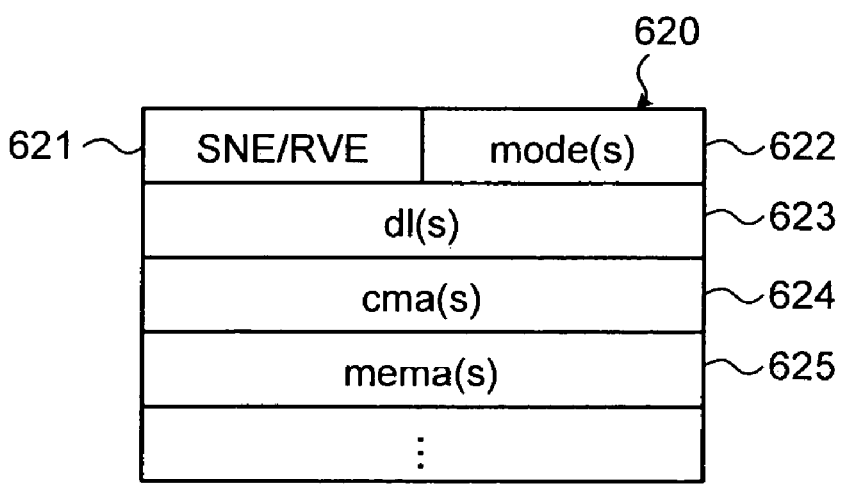
FIG. 6B is a diagram of a configuration of a descriptor for data writing.

FIG. 6A is a diagram of a configuration of a descriptor for data-reading that is created by the updated-data block and FIG. 6B is a diagram of a configuration of a descriptor for data writing that is created by the updated-data block. A descriptor 610 for data-reading shown in FIG. 6A includes an SNE/RVE field 611, a mode(r) field 612, a dl(r) field 613, a cma(r) field 614, and a mema(r) field 615. The SNE/RVE field 611 stores a descriptor identifier that identifies a descriptor that is used in a receive engine 337 or a descriptor that is used in a send engine 342 in the protocol DMA chip 330. The protocol DMA chip 330 is described later. The mode(r) field 612 indicates contents of a reading process. The dl(r) field 613 designates a data-transfer length. The cma(r) field 614 designates an address of a source of transfer on the cache memory 32. The mema(r) field 615 designates an address of a destination of transfer of the receive engine 337 in a reading data storage buffer 341. According to the first embodiment, three modes can be selected as the mode(r) field 612. These three modes are:
1) A mode in which an interrupt to the MPU chip set 310 is performed after a termination of a process that is described in the descriptor 610 for data reading, and a notification is provided,
2) A mode in which the interrupt to the MPU chip set 310 is not performed after a termination of a process of checking of the BCC of data that is read, and
3) A mode in which the interrupt to the MPU chip set 310 is not performed after a termination of a process of checking the FCC of the data that is read.

A descriptor 620 for data reading shown in FIG. 6B includes an SNE/RVE field 621, a mode(s) field 622, a dl(s) field 623, a cma(s) field 624, and a mema(s) field 625. The SNE/RVE field 621 stores a descriptor identifier that identifies the descriptor that is used in the receive engine 337 or the descriptor that is used in the send engine 342 in the protocol-DME chip 330. The mode(s) field 622 indicates the contents of the reading. The dl(s) field 623 designates the data-transfer length. The cma(s) field 624 designates an address of a destination of transfer on the cache memory 32. The mema(s) field 625 designates an address of a source of transfer in a writing data buffer 335 of a protocol controller 334 in the protocol-DME chip 330 or the address of the source of transfer in the reading data storage buffer 341 of the receive engine 337. According to the first embodiment, two modes can be selected as the mode(s) field 622. These two modes are:
1) A mode in which an interrupt to the MPU chip set 310 is performed after a termination of a process that is described in the descriptor 620 for data-reading, and a notification is provided, and
2) A mode in which the interrupt to the MPU chip set 310 is not performed by designating a creating of the BCC of the data that is written.

Figure 7:
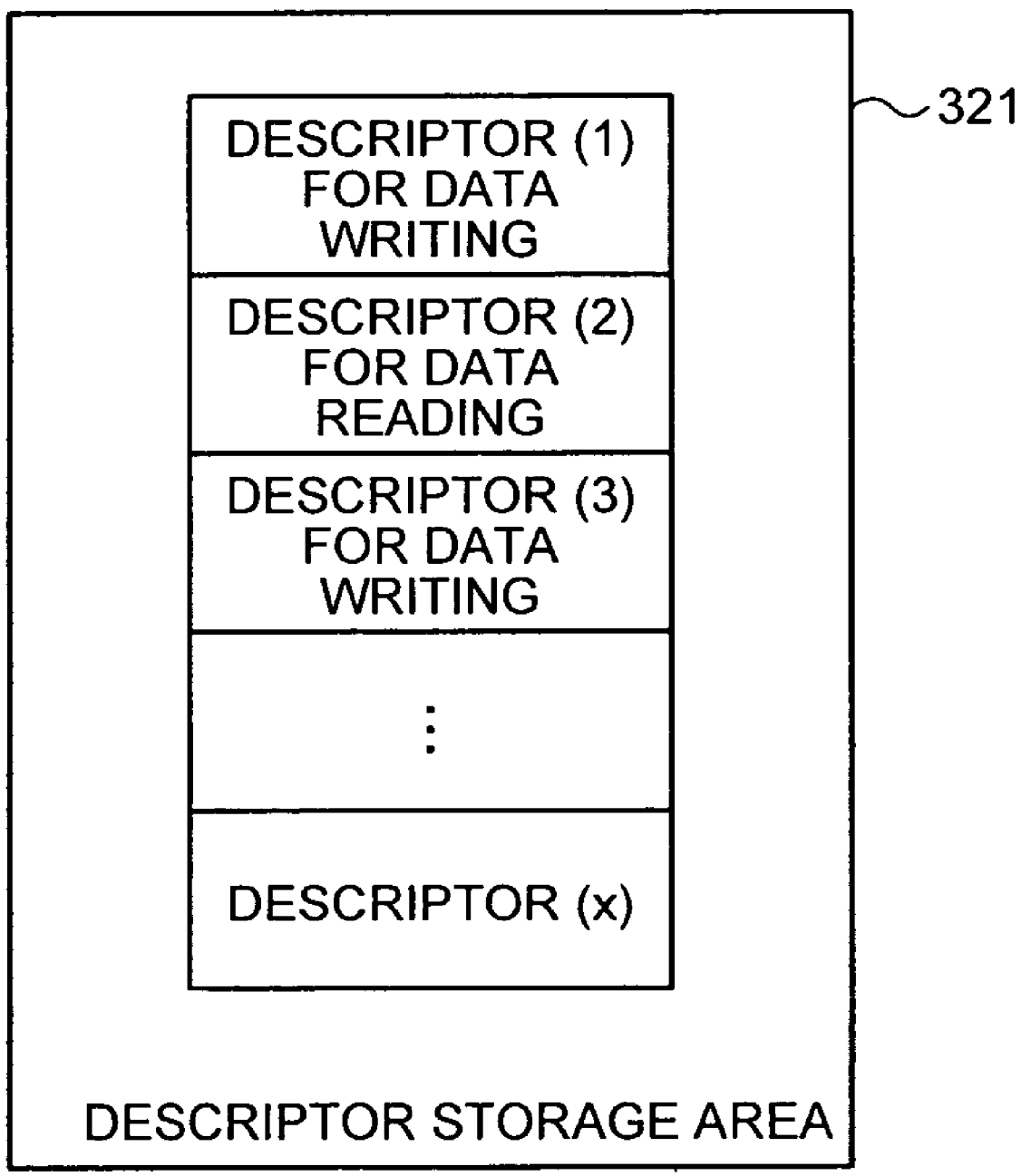
FIG. 7 is a schematic diagram of a descriptor storage area of a memory.

The memory 320 stores data such as data that is used for processing the MPU chip set 310, and is connected to the MPU chip set 310. The memory 320 is provided with a descriptor storage area 321 that stores descriptors that are created by the data processing block 311 of the MPU chip set 310. FIG. 7 is a schematic diagram of a descriptor storage area of a memory. As shown in FIG. 7, the descriptors created by the MPU chip set 310 are stored one by one in the descriptor storage area 321. In this case, a new descriptor is added at a bottom in the diagram. In this diagram, a descriptor (1) for data-writing, a descriptor (2) for data-reading, a descriptor (3) for data-writing, and a descriptor (x) are stored one by one from top to bottom, and the descriptor (x) is the newest descriptor created. The descriptor (1) for data-writing writes data newly in the cache memory 32. The descriptor (2) for data-reading and the descriptor (3) for data-writing are for the ReadModifyWrite process that is executed in continuation and is a process of updating data (records) in the CKD format on the cache memory 32, which is described later.

The protocol DMA chip 330 is an LSI that controls a protocol of a fiber channel that is used in connection with the host computer 40 and takes charge of an interface with the cache manager 33. The protocol DMA chip 330 is disposed between the host computer 40 that outputs a request for an access of writing data etc., and the cache memory 32. The protocol DMA chip 330 has a built-in DMA function of transferring data between the host computer 40 and the cache memory 32 without allowing it to pass via the processor (MPU chip set 310). The protocol DMA chip 330 performs communication with the cache manager 33 according to instructions from the MPU chip set 310. A case in which the host computer 40 and the disc array unit 10 are connected by an optical fiber is shown in FIG. 4. An opto-electric converter 360 is provided at a side of the host computer 40 where the protocol DMA chip 330 is connected. The opto-electric converter 360 converts an optical signal that is sent from the host computer 40, to an electric signal and an electric signal from the disc array unit 10, to an optical signal.

The protocol DMA chip 330 includes a PCI I/F 331, a host I/F 332, a CM I/F 333, a protocol controller 334, a descriptor reading block 336, the receive engine 337, and the send engine 342. The PCI I/F 331 is an interface with the MPU chip set 310. The host I/F 332 is an interface with the host computer 40. The CM I/F 333 is an interface with the cache manager 33. The protocol controller 334 controls a protocol of a fiber channel that is used for connecting the protocol DMA chip 330 with the host computer 40. The descriptor reading block 336 reads a descriptor that is set in the memory 320 by the MPU chip set 310. The receive engine 337 performs a process while reading data from the cache memory 32. The send engine 342 performs a data processing of the cache memory 32 according to a request for writing data from the host computer 40.

The protocol controller 334 includes the writing data buffer 335 that stores update-request data (hereinafter, "update data") and writing-request data (hereinafter, "writing data") sent from the host computer 40. The writing data buffer 335 is a writing data storage unit. The descriptor reading block 336 has a function of reading a descriptor that is stored in the memory 320 by the data processing block 311 of the MPU chip set 310, and notifying descriptor information read in a related processing section.

The receive engine 337 is a module that reads data from the cache memory 32 and includes a CM reading block 338, a BCC checking block 339, an FCC checking block 340, and the reading data storage buffer 341. The CM reading block 338 reads cache data from the cache memory 32. The BCC checking block 339 ensures for each logical block the cache data that is read from the cache memory 32. The FCC checking block 340 ensures for each field the cache data that is read from the cache memory 32. The reading data storage buffer 341 stores the cache data that is read by the CM reading block 338. The receive engine 337 is a data receiving unit and the cache data is data subjected to updating.

The CM reading block 338 reads the cache data from the cache memory 32 based on a cache address cma(r) field 614 that is described in the descriptor 610 for data reading, and writes the cache data in an address of the reading data storage buffer 341 that is designated at the mema(r) field 615 in the descriptor 610 for data reading. Moreover, the CM reading block 338 passes the data that is read to the BCC checking block 339 or to the FCC checking block 340 according to designation of the mode(r) field 612 in the descriptor 610 for data reading. If a notification to the MPU chip set 310 is selected as the mode(r) field 612, this is just a reading process of data and a notification of termination of data transfer is provided to the MPU chip set 310 after termination of writing the data in the reading data storage buffer 341. The CM reading block 338 is a data reading function of the data receiving unit.

The BCC checking block 339 has a function of performing an error check of the cache data that is passed from the CM reading block 338 for each logical block, comparing it with the block-checking code that is attached to the logical block, and checking if there is an error in the data that is stored in the reading data storage buffer 341. If an error is judged to be there, the BCC checking block 339, irrespective of a setting of the mode(r) field 612 in the descriptor 610 for data reading, informs the MPU chip set 310 that there is an error in the data reading from the cache memory 32 and terminates the process being executed.

The FCC checking block 340 has a function of performing an error check of the cache data that is passed from the CM reading block 338 for each field, comparing it with the field-checking code that is attached to the field, and checking if there is an error in the data that is stored in the reading data storage buffer 341. If an error occurs, the FCC checking block 340, irrespective of the setting of the mode(r) field 612 in the descriptor 610 for data reading, informs the MPU chip set 310 that there is an error in the data reading from the cache memory 32, and terminates the process being executed. The BCC checking block 339 and the FCC checking block 340 are an error checking function of the data receiving unit.

The reading data storage buffer 341 stores the cache data that is read from the cache memory 32 by the CM writing block 346 in an address that is designated at the mema(r) field 615 of the descriptor 610 for data-read. The reading data storage buffer 341 is a reading-data storing function of the data receiving unit.

The send engine 342 is a module that transfers to the cache memory 32 data that is to be updated or to be newly written from the host computer 40, and includes a data reading block 343, a BCC creating block 344, an FCC creating block 345, and the CM writing block 346. The data reading block 343 reads data that is written in the cache memory. The BCC creating block 344 creates the field-checking code of the data read for each logical block. The FCC creating block 345 creates the field-checking code for a part of that field when it is an update field that includes contents of updating the data reading. The CM writing block 346 creates data of logical-block length that is written in the cache memory 32 from data from the data reading block 343, the BCC creating block 344, and the FCC creating block 345. The send engine 342 is a data sending unit.

The data reading block 343 has a function of reading data for each unit of field (field writing block unit) selectively from the reading data storage buffer 341 of the receive engine 337 or from the writing data buffer 335 of the protocol controller 334 based on the descriptor 620 for data writing. Concretely, if there is a writing of new data in the descriptor 620 for data writing, the data reading block 343 reads the writing data that is stored in the writing data buffer 335 of the protocol controller 334 and sends this data to the CM writing block 346, the BCC creating block 344, and the FCC creating block 345. Moreover, if there is a writing of updated data, i.e. the ReadModifyWrite process in the descriptor 620 for data writing, the data reading block 343 reads a field (hereinafter, "update field") that includes a content that is updated, from the writing data buffer 335 of the protocol controller 334 and sends this data the CM writing block 346, the BCC creating block 344, and the FCC creating block 345. The data reading block 343 reads a field that includes a content that is not updated, from the reading data storage buffer 341 of the receive engine 337 and sends this data to the CM writing block 346 and the BCC creating block 344. The data reading block 343 is a data reading function of the data sending unit.

The BCC creating block 344 has a function of calculating and creating the BCC in the units of logical block for data that is passed from the data reading block 343, based on the descriptor 620 for data writing and outputting the BCC-CRC that is created, to the CM writing block 346. While performing this function, if writing data is written newly or if a field that includes the content that is updated by the ReadModifyWrite process is written, the BCC creating block 344 calculates upon acquiring from the FCC creating block 345 a value of the FCC-CRC that is to be added at a predetermined position in that field. Thus, the data reading block 343 changes over the data that is read. Therefore, upon calculating the BCC, for the field that is not updated, cache data stored in the reading data storage buffer is used and for the field that is updated, update-data that is stored in the writing data buffer 335 is used. The BCC creating block 344 is a BCC creating function of the data sending unit.

The FCC creating block 345 has a function of creating upon calculating the FCC for each field for data that is sent by the data reading block 343 from the writing data buffer 335 of the protocol controller 334, in other words, an update field that includes the content that is updated, based on the descriptor 620 for data writing, and outputting the FCC-CRC created, to the CM writing block 346. The FCC creating block 345 is an FCC creating function of the data sending unit.

The CM writing block 346 has a function of creating fixed-length data (logical block) that is written in the cache memory 32 from the FCC-CRC that is input from the FCC checking block 340, the BCC-CRC that is input from the BCC checking block 339, and data that is passed from the data reading block 343, based on the descriptor 620 for data writing. Concretely, in the disc array unit 10 according to the first embodiment, since the data is managed in logical blocks of fixed length of 512 bytes, when the data from the data reading block 343 becomes 512 bytes, the BCC-CRC is added to it. Moreover, the FCC-CRC is attached at a predetermined position of the field writing block that includes a backmost portion of each field while writing the data newly, and at a predetermined position of the field writing block that includes a backmost portion of the field when a filed that includes the content that is updated in the logical block. Writing of data in the cache memory 32 is in units of half logical blocks. The CM writing block 346 is a data writing function of the data sending unit.

Thus, in the send engine 342, while writing the updated data in the cache memory, the BCC-CRC is rewritten simultaneously with the updating of the data. This is because, if the rewriting of the data and the updating of the BCC-CRC is performed separately, during the time after the rewriting of the data and till rewriting the BCC-CRC, ensuring by the BCC in that logical block becomes impossible.

Figure 8:
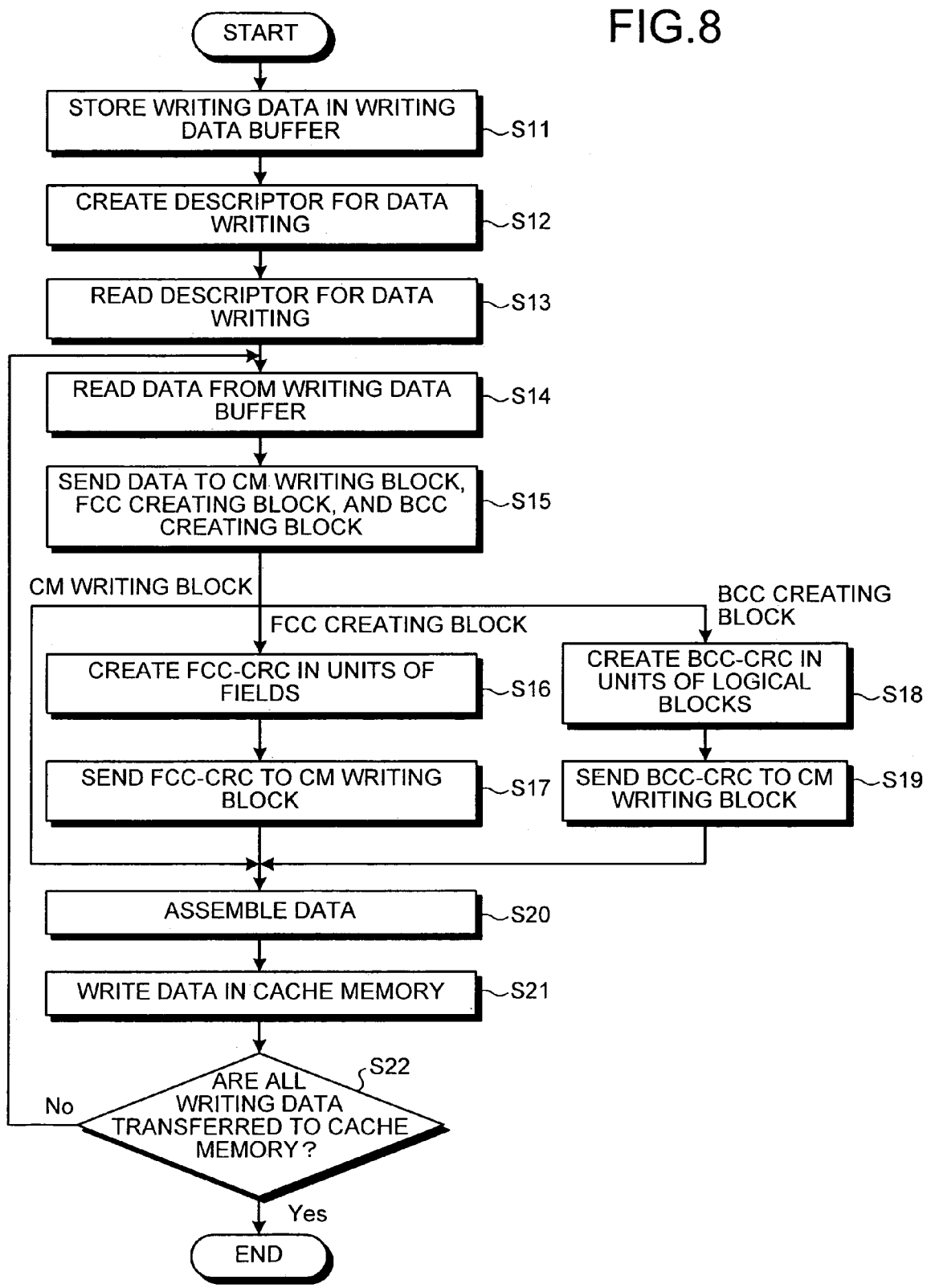
FIG. 8 is a flow chart of a process of writing new data in the cache memory.

A writing process in which, data is written newly in the cache memory 32 by the channel adapter 31 and the ReadModifyWrite process of renewing that data that is already stored are described below. FIG. 8 is a flow chart of a procedure for writing new data in the cache memory. The process of writing the data indicates a process in the channel adapter 31 of the disc array unit 10 while writing data that has the CKD format, in the disc array unit 10 that manages data in the fixed-length data format.

To start with, when a request for writing new data and data to be written are received from the host computer 40, the data processing block 311 of the MPU chip set 310 stores the data to be written in the writing data buffer 335 of the protocol controller 334 of the protocol DMA chip 330 (step S11). The data processing block 311, based on the data to be written that is received, creates the descriptor 620 for data writing to perform the writing (step S12). The descriptor 620 for data writing is stored in the descriptor storage area 321 in an order of creating. At this time, in the descriptor 620 for data writing, an SNE (send engine) is set in the SNE/RVE field 621, a notification to the MPU chip set is set in the mode(s) field 622, a record to be written (data that has CKD data format) is set in the dl(s) field 623, an address on the cache memory 32 of the destination of writing is set in the cma(s) field 624, and an address that is stored in the writing data in the writing data buffer 335 is set in the mema(s) field 625.

Then, the descriptor reading block 336 reads the descriptor 620 for data writing that is stored in the descriptor storage area 321 of the memory 320 (step S13). The descriptor reading block 336, according to the descriptor 620 for data writing, provides notification of descriptor information in the descriptor to a related processor, i.e. the send engine 342 in this case, and starts writing the data. The data reading block 343 of the send engine 342 reads a field in the writing data from the address of the writing data buffer 335 that is designated to the mema(s) field 625 of the descriptor 620 for data writing (step S14) and sends this data to the CM writing block 346, the FCC creating block 345, and the BCC creating block 344 (step S15).

In the FCC creating block 345, the FCC-CRC is created upon calculating the FCC in units of fields, for the data that is read (step S16). When the unit that is calculated reaches a length of the field, the FCC creating block 345 sends the FCC-CRC created to the CM writing block 346 (step S17).

On the other hand, in the BCC creating block 344, for this data, the BCC-CRC is created upon calculating the BCC in the units of logical blocks (step S18). When the unit that is calculated reaches a length of the logical field, the BCC creating block 344 sends the BCC-CRC created, to the CM writing block 346 (step S19). When the data is flowing from the writing data buffer 335, a result of a calculation of the FCC is notified from the FCC creating block 345 to the BCC creating block 344, and based on the calculation result of the FCC, the BCC is calculated.

Further, the CM writing block 346 assembles data in the units of logical blocks according to an arrangement while writing the data in the cache memory 32 by using the data that is sent to the CM writing block 346 at step S15, the FCC-CRC that is sent at step S17, and the BCC-CRC that is sent at step S19 (step S20). In other words, the FCC-CRC that is created at step S16 is written in a backmost portion of the field-writing block in which the backmost portion of the field is stored for each field, as well as the BCC-CRC that is created at step S18 is added to the backmost portion for each logical block. At this time, the writing is performed such that no more than one field is included in one field-writing block. Moreover, data in the CKD format is written in data that is managed by the fixed-length format, according to an arrangement of managing the data in the cache memory 32 such as while writing a different record in continuation with a certain record, the next record is written from a front end of the half logical block.

The CM writing block 346 performs the writing upon transferring the data assembled to the cache memory 32 in the units in which it is managed in the cache memory 32 (step S21). After this, a judgment of whether the transfer of the writing data to the cache memory 32 is terminated or not is made (step S22). If the transfer of the writing data to the cache memory 32 is not yet terminated (No at step S22), the process returns to step S14 and the steps from step S14 onward are repeated. If the transfer of the writing data to the cache memory 32 is terminated (Yes at step S22), the CM writing block 346 sends a notification of termination of data transfer to the descriptor reading block 336. The CM writing block 346 also notifies to the MPU chip set 310 by interruption that the process of the descriptor 620 for data writing is terminated and the writing in the cache memory 32 ends.

Figure 9A:
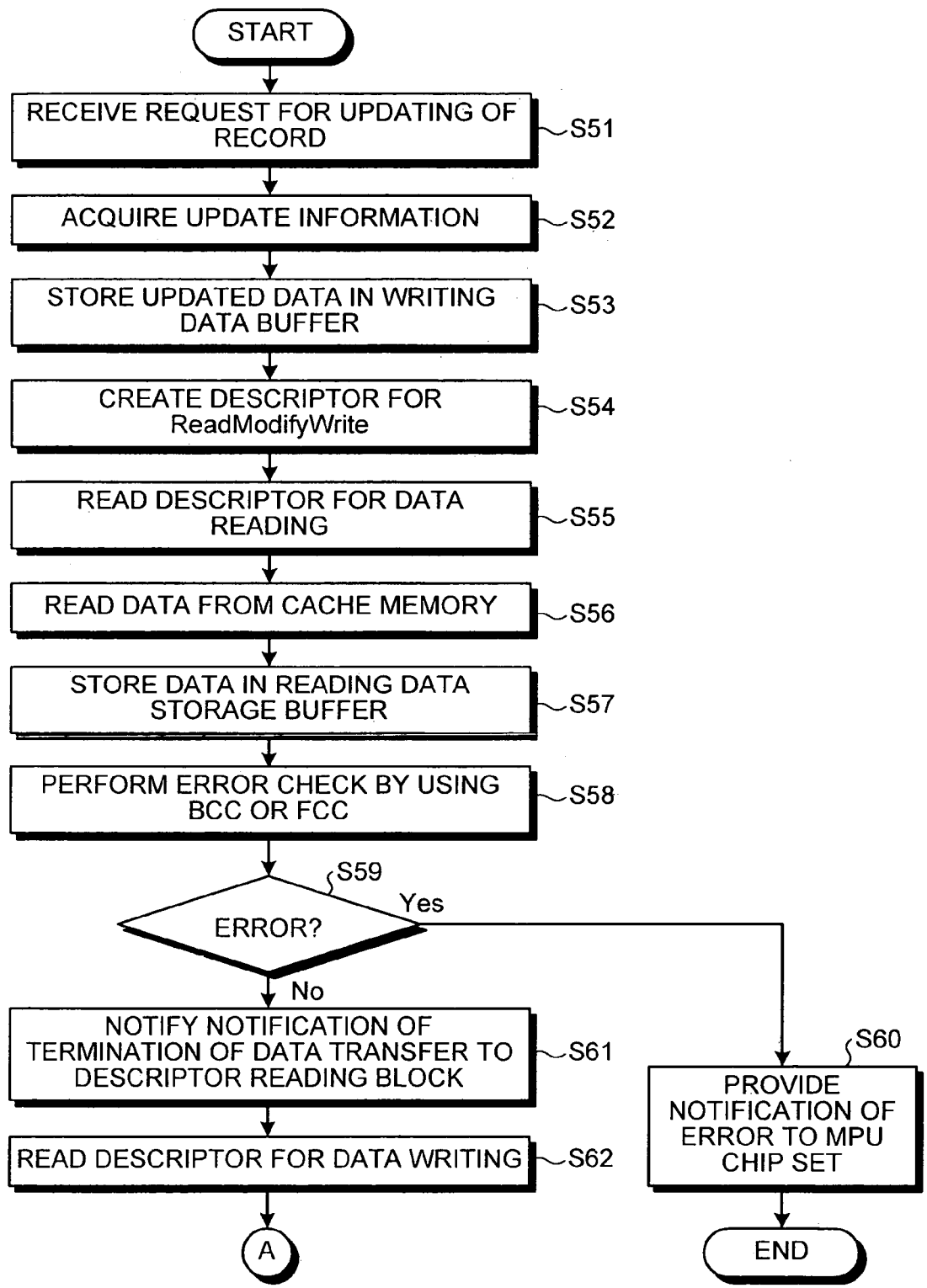
FIG. 9A is a flow chart of a procedure for a ReadModify-Write process of updating data in the cache memory.
Figure 9B:
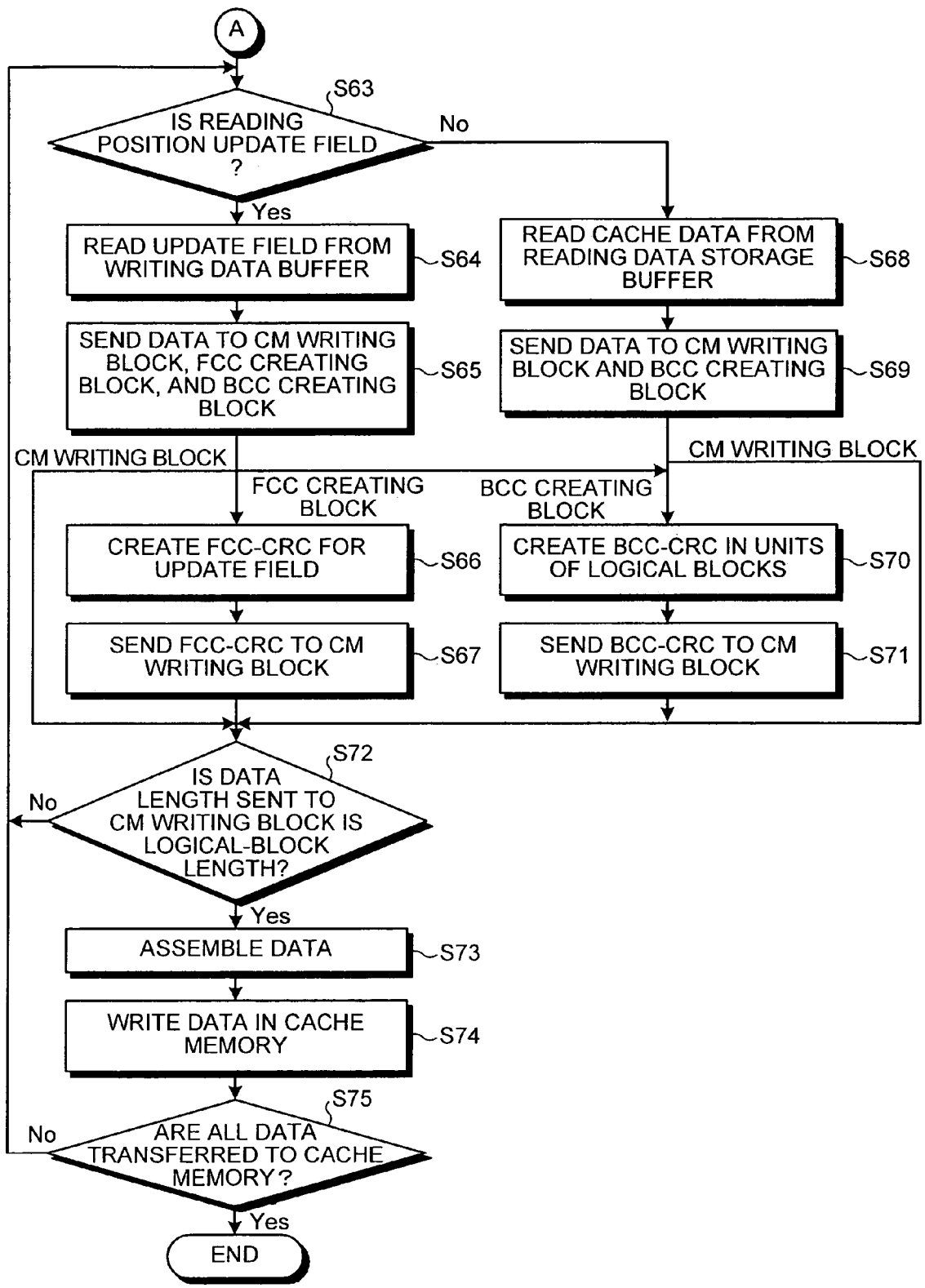
FIG. 9B is a flow chart of the procedure for ReadModify-Write process of updating data in the cache memory.

Next, the ReadModifyWrite process of updating data that is already stored is described below. FIGS. 9A and 9B are flow charts of a procedure for the ReadModyfyWrite process of updating data in the cache memory. The ReadModifyWrite process indicates a process in the channel adapter 31 of the disc array while writing data in the CKD format, in the disc array unit 10 that manages data in the fixed-length data format.

To start with, when the channel adapter 31 receives a request for updating of the record in the CKD format from the host computer 40 (step S51), the data processing block 311 of the MPU chip set 310 exchanges information about the data to be updated (records) between the host computer 40 and the data processing block 311 and acquires information of update such as, as to which field among the data that is sent at the next step, is to be updated (step S52).

Then, as the data to be updated is received from the host computer 40, the data to be updated is stored in the writing data buffer 335 of the protocol controller 334 of the protocol DMA chip 330 (step S53). The data processing block 311 of the MPU chip set 310, based on the information of update and the data to be updated, creates a descriptor for performing the ReadModifyWrite process (step S54) and stores it in the descriptor storage area 321 of the memory 320. The descriptor for the ReadModifyWrite process includes a descriptor that is in continuation with the descriptor 610 for data reading that reads the logical block, which includes the content updated from the cache memory 32 and the descriptor 620 for data writing that writes in the cache memory 32 the data with the content updated.

Among these descriptors, in the descriptor 610 for data reading in FIG. 6A, an RVE (receive engine) is set in the SNE/RVE field 611, "check BCC" or "check FCC" is set in the mode(r) field 12, a length of a record (data in the CKD format) that is transferred to the reading data storage buffer 341 upon reading is set in the dl(r) field 613, an address on the cache memory 32 that is read is set in the cma(r) field 614, and an address that is written in the reading data storage buffer 314 is set in the mema(r) field 615.

In the descriptor 620 for data writing in FIG. 6B, the SNE (send engine) is set in the SNE/RVE field 622, "notification to the MPU chip set" is set in the mode(s) field 622, a length of a writing record (data in CKD data format) is set in the dl(s) field 623, an address on the cache memory 32 that is read is set in the cma(s) field 624, and an address that is stored in the update data in the writing data buffer 335 or an address that is stored in the cache data in the reading data storage buffer 341 is set in the mema(s) field 625.

By "notification to the MPU chip set" not set in the mode(r) field 622 of the descriptor 610 for data-read, the descriptor reading block 336 recognizes that the descriptor 620 for data writing that is stored is executed in continuation next to the descriptor 610 for data reading of the descriptor storage area. In other words, the ReadModifyWrite process is performed by executing the two descriptors continuously. A plurality of the descriptor 620 for data writing are created so that the descriptors 620 for data writing are set to read from the writing data buffer 335 of the protocol controller 334 for the field that includes the content to be updated and to read from the reading data storage buffer 341 of the receive engine 337 for the field other than that that includes the content to be updated.

Further, the descriptor reading block 336 reads the descriptor 610 for data reading that is stored in the descriptor storage area 321 of the memory 320 (step S55). The descriptor reading block 336, according to the descriptor 610 for data reading, provides notification of descriptor information in the descriptor 610 for data reading, i.e. the receive engine 337 in this case.

The CM reading block 338 of the receive engine 337 reads data from the address on the cache memory 32 that is designated in the cma(r) field 614 of the descriptor 610 for data reading (step S56) and writes it in the address on the reading data storage buffer 341 that is designated in the mema(r) field 615 of the descriptor 610 for data reading (step S57). At this time, the data that is written is a logical block not less than one that includes the variable-length data.

The CM reading block 338 passes the data that is read simultaneously, to the BCC checking block 339 or the FCC checking block 340 based on the setting of the mode(r) field 612 in the descriptor 610 for data reading, performs an error check by using the BCC or the FCC (step S58), and makes a judgment of whether there is an error in the data reading (step S59). If there is an error (Yes at step S59), the BCC checking block 339 or the FCC checking block 340, irrespective of the setting of the mode(r) field 612 in the descriptor 610 for data reading, provides notification of the error in the data read to the MPU chip set 310 (step S60) and terminates the ReadModifyWrite process. On the other hand, if there is no error (No at step S59), the BCC checking block 339 or the FCC checking block 340 provides notification of this result to the CM reading block 338. The CM reading block 338 notifies the notification of the termination of the data transfer to the descriptor reading block 336 (step S61) and the process of the receive engine 337 based on the descriptor 610 for data reading ends.

The descriptor reading block 336 reads the next descriptor 620 for data writing that is stored in the descriptor storage area 321 (step S62). The descriptor reading block 336, according to the descriptor 620 for data writing, provides notification of descriptor information in the descriptor 620 for data writing, i.e. the send engine 342 in this case.

The data reading block 343 of the send engine 342 makes a judgment of whether it is a field (hereinafter, "update field") that includes a content for which a position on the logical block that is read is updated (step S63). If the position of the data that is read is an update field (Yes at step S63), the data reading block 343 reads data only for a length of the field that includes the content that is updated, from the writing data buffer 335 of the protocol controller 334 (step S64), and sends this data to the CM writing block 346, the FCC creating block 345, and the BCC creating block 344 (step S65). At the FCC creating block 345, the FCC for the update field is calculated and the FCC-CRC is created (step S66). Then, the FCC creating block 345 sends the FCC-CRC created, to the CM writing block 346 (step S67). At the same time, at the BCC creating block 344, the BCC is calculated in units of logical blocks for this data and BCC-CRC is created (step S70). Then, as the unit that is calculated reaches the length of the logical block, the BCC creating block 344 sends the BCC-CRC created to the CM writing block 346 (step S71). If the FCC creating block 345 creates the FCC-CRC of the update field, the BCC creating block 344 is provided the notification of a result of calculation of the FCC-CRC from the BCC creating block 344 and calculates the BCC based on the FCC-CRC.

On the other hand, if the position of the data that is read at step S63 is not the update field (No at step S63), the data reading block 343 of the send engine 342 reads the cache data from the reading data storage buffer 341 of the receive engine 337 (step S68), and sends this data to the CM writing block 346 and the BCC creating block 344 (step S69). Further, as described in steps S70 and S71, the BCC creating block 344 calculates the BCC in units of the logical blocks, then creates the BCC-CRC, and sends to the CM writing block 346. In this case, the FCC-CRC is not created by the FCC creating block 345 for not being a field that is updated and the FCC-CRC stored in the field in the cache data is used.

After steps S65, S67, S69, and S71, the data reading block 343 makes a judgment of whether a length of the data sent to the CM writing block 346 is a logical-block length (step S72). If the length of the data is not the logical-block length (No at step S72), the process returns to step S63 and steps till the length of the data becomes the logical-block length are repeated. If the length of the data sent is the logical-block length (Yes at step S72), the CM writing block 346 assembles data according to an arrangement while writing the data in the cache memory 32 by using the data sent to the CM writing block 346 at step S65 or S69, the data sent to the FCC-CRC sent at step S67, and the BCC-CRC sent at step S71 (step S73). In other words, the field that is not updated and the update field are assembled one by one, the FCC-CRC created at step S66 is written in a backmost portion of the field-writing block in which a backmost portion of the update field is stored and the BCC-CRC created at step S70 is added to the backmost portion for each logical block. At this time, writing is performed such that not more than one field is included in one field-writing block. Moreover, data in the CKD format is written in data that is managed by the fixed-length format, according to an arrangement for managing the data in the cache memory 32 such as while writing a different record in continuation with a certain record, the next record is written from the front end of the half logical block.

The CM writing block 346 performs the writing upon transferring the data assembled to the cache memory 32 in the units in which it is managed in the cache memory (step S74). After this, the CM writing block 346 makes a judgment of whether the transfer of the data of the logical block that includes the content to be updated, to the cache memory 32, is terminated or not (step S75). If the transfer of the data to the cache memory 32 is not yet terminated (No at step S75), the process returns to step S63 and the steps from step S63 onward are repeated. If the transfer of the data to the cache memory 32 is terminated (Yes at step S75), the CM writing block 346 sends a notification of the termination of data transfer to the descriptor reading block 336. The CM writing block 346 also notifies to the MPU chip set 310 by interruption that the process of the descriptor 620 for data writing is terminated and the ReadModifyWrite process of the update data to the cache memory 32 ends.

Thus, according to the first embodiment, in a storage unit that performs management in a fixed-length data format of data in a variable-length data format, the management of data is performed by attaching the BCC and the FCC that are error-checking codes acquired by calculation performed by using an overall content of respective data for each fixed-length data and each field that is included in the variable-length data. This enables to improve reliability of the data. Particularly, while updating the data, due to an occurrence of a fault, even if the data is not updated for certain portion of fixed-length data or for each field, the error can be detected at a time of reading the data in that portion.

Moreover, while updating the data in the variable-length data format, it is sufficient just to update the field-writing block that corresponds to the field that includes the content to be updated, as data and it is not necessary to update the overall data. Apart from this, only the FCC-CRC of a field portion that is updated and the BCC-CRC of the logical block that includes the updated field is to be calculated and added to the respective predetermined positions. This enables to perform quickly the updating of data between different data formats.

In the cache memory of the disc array unit according to the first embodiment, although the data is stored as 512 bytes of fixed-length data plus 8 bytes of BCC-CRC data, the data management is performed in the units of half logical blocks of 256 bytes. Therefore, in the ReadModifyWrite process, the data can be updated more efficiently by dividing the process into two cases viz. a case in which the update data is in a half logical block in a first half (fixed-length data) and a case in which the update data is in a half logical block in a second half. A method with such an arrangement is described as a second embodiment of the present invention.

A structure of a channel adapter and a protocol DMA chip that are used in a disc array unit according to the second embodiment is same as that described in FIGS. 4 and 5 according to the first embodiment, hence the description is omitted. However, the data processing block 311 in the MPU chip set 310 in FIG. 4, in addition to the function described in the first embodiment, has a function of calculating a position of an update field for finding a position of the update field in a logical block. Concretely, the function of calculating the position of the update field includes finding out as to in which data management unit in the logical block the update field is positioned, when the data management units in the cache memory 32 are divided into a plurality of units having a length shorter than the logical block. Then, a descriptor is created according to the position of the update result that is found.

Update information that is exchanged between the host computer 40 and the channel adapter 31 before performing the ReadModifyWrite process on data includes information of as to which field in a record (CKD data) is updated. Moreover, information about a length of a key section and a data section is included in a count section of the CKD data and the counter section has a fixed length. From this information, a calculation of as to from which byte from the front end of the data (record) is a file that includes the data to be updated, is performed. As according to the first embodiment, when the cache memory 32 is performing the data management in units of a half of the logical block (half logical block), it is possible to find easily whether the position of the data to be updated is in the half logical block in the first half or in the half logical block in the second half. As a matter of course, when the length of the record (CKD data) is longer than a length of one logical block, the position of the update field can be found by subtracting length of logical blocks that can be included in the record and calculating in the similar manner. Moreover, even when the record starts from the half logical block in the second half and is data longer than the length of the half logical block, the position of the update field can be found by subtracting the length of the half logical block, and similarly by subtracting the length of logical blocks that can be included when necessary.

If the update data is in the half logical block in the first half, the data processing block 311 creates the descriptor such that the same ReadModifyWrite process as according to the first embodiment is performed. If the update data is in the half logical block in the second half, the data processing block 311 uses the half logical block in the first half only for calculating the BCC-CRC by using data read from the cache memory 32, and creates the descriptor 610 for data reading and the descriptor 620 for data writing for performing the ReadModifyWrite process same as according to the first embodiment on the half logical block in the second half.

Figure 10:
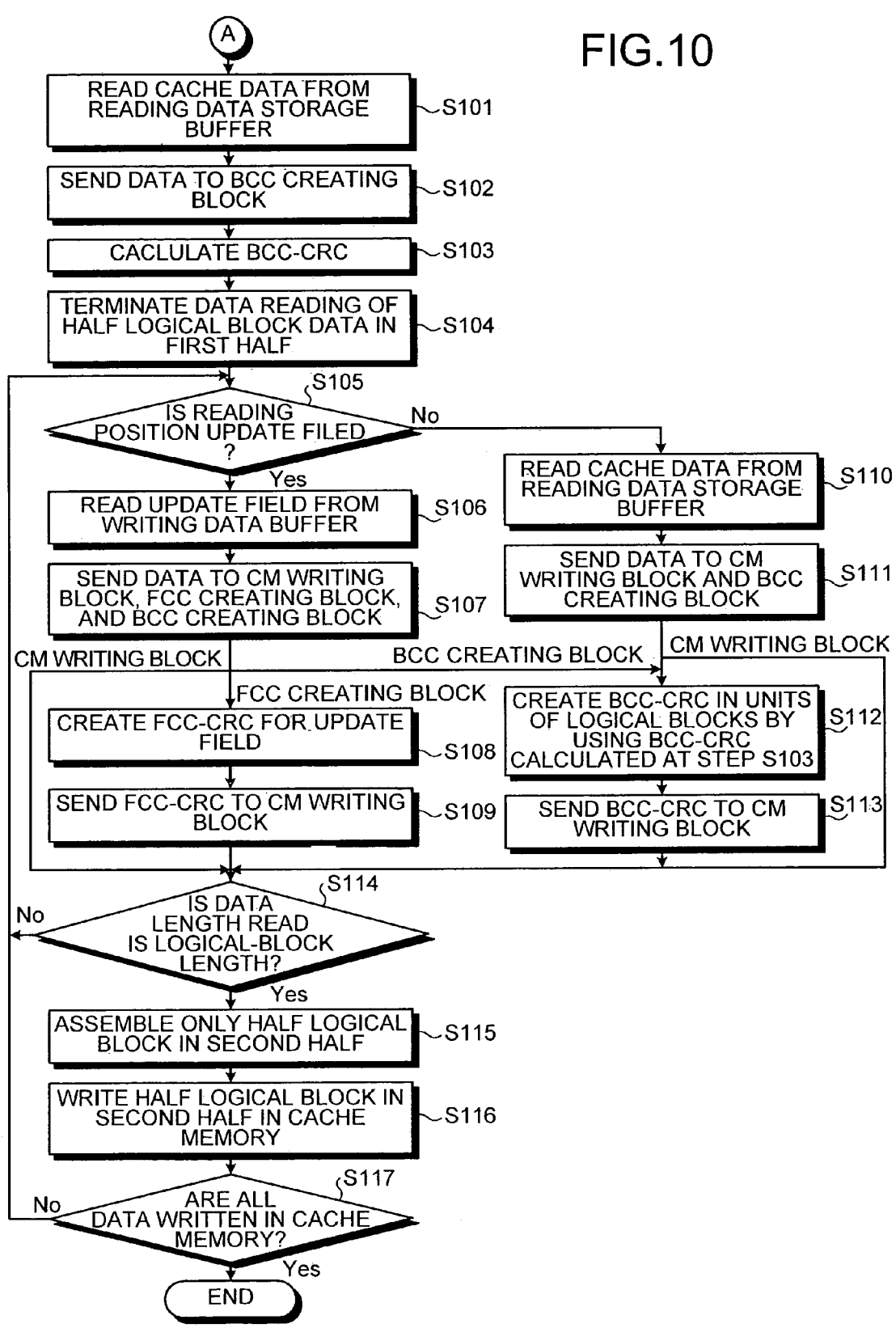
FIG. 10 is a flow chart of another procedure for still another ReadModifyWrite process when there is an update field in a half logical block in a second half.
Figure 11:
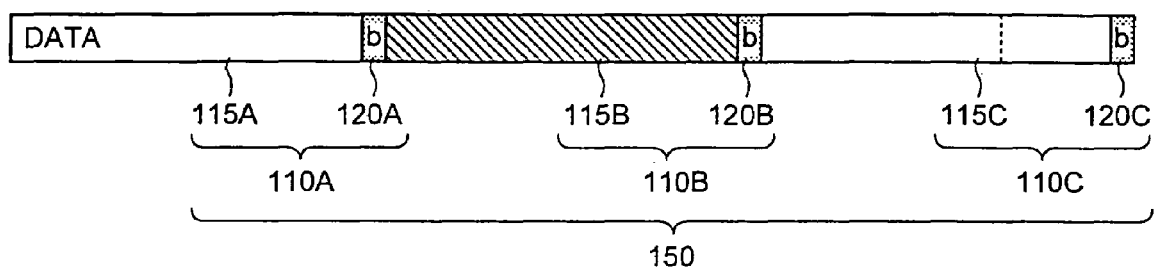
FIG. 11 is a schematic diagram of a conventional structure of data in a logical block.

Next, a processing procedure of the channel adapter according to the second embodiment is described below. If the update field is in the half logical block in the first half, the same process as according to the first embodiment is required to be performed. Since the process has already been described the description is omitted here. A case in which the update field is in the half logical block in the second half is described below. However, steps up to the step of reading the logical block that includes the update data being the same as that according to the first embodiment described with reference to FIG. 9A, the description is omitted. Writing of data after the reading is described with reference to a flow chart in FIG. 10. FIG. 10 is a flow chart of another procedure for ReadModifyWrite process when there is an update field in the half logical block in the second half.

As described with reference to FIG. 9A in the first embodiment, when a request for update is received and after the update data is stored in the writing data buffer 335 of the protocol controller 334, the data processing block 311 of the MPU chip set 310 creates a descriptor for the ReadModifyWrite process. Based on this descriptor 610 for data reading, the cache data in the cache memory 32 is stored in the reading data storage buffer 341 of the receive engine 337. Next, the descriptor 620 for data writing is read by the descriptor reading block 336 and a notification of descriptor information in the descriptor 620 for data reading is provided to a related processor, i.e. the send engine 342 in this case (steps S51 to S62). However, in the descriptor 620 for data writing created by the data processing block 311, the half logical block in the first half calculates only BCC-CRC by using the cache data and does not transfer the data to the CM writing block 346. The half logical block in the second half uses data in the writing data buffer 335 for the update field and uses the cache data for a field other than the update field and creates the update data.

Further, the data reading block 343 of the send engine 342 recognizes from the descriptor 620 for data writing that a position in the logical block in which the update field is included is in the half logical block in the second half, reads the half logical block in the first half from the reading data storage buffer 341 of the receive engine 337 (step S101), and sends it to the BCC creating block 344 (step S102). At this time, the data that is read is not sent to the CM writing block 346. In other words, only a calculation of BCC that is required for creating the BCC-CRC of the overall logical block is performed (step S103).

As the reading of the half logical block in the first half terminates (step S104), the writing of the half logical block in the second half starts. The data reading block 343 of the send engine 342 makes a judgment of whether a position on a reading logical block is an update field or not (step S104). If the position of the data that is read is the update field (Yes at step 105), the data reading block 343 reads from the writing data buffer 335 of the protocol controller 334 only a portion of the length of the field that includes the content that is updated (step S106), and sends this data to the CM writing block 346, the FCC creating block 345, and the BCC creating block 344 (step S107). At the FCC creating block 345, the FCC is calculated for that update field and FCC-CRC is created (step S108). Further, the FCC creating block sends the FCC-CRC created to the CM writing block 346 (step S109). Moreover, at the same time, at the BCC creating block 344, for that update field, the BCC is calculated in units of logical blocks by using the BCC-CRC that is calculated at step S103 and the BCC-CRC is created (step S112). At the BCC creating block 344, when the unit that is calculated reached the length of the logical block, the BCC-CRC created is sent to the CM writing block 346 (step S113). If the FCC creating block 345 creates the FCC-CRC of the update block, the FCC creating block 345 provides a notification of a result of calculation of the FCC-CRC to the BCC creating block 344 and the BCC creating block 344 calculates the BCC by using the FCC-CRC.

On the other hand, if the position of the data that is read at step S105 is not the update data (No at step S105), the data reading block 343 of the send engine 342 reads the cache data from the reading data storage buffer 341 of the receive engine (step S110) and sends that data to the CM writing block 346 and the BCC creating block 344 (step S111). Then, as described in steps S112 and S113, the BCC creating block 344 calculates the BCC in units of logical blocks by using the BCC-CRC that is calculated at step S103, and creates the BCC-CRC. The BCC-CRC created is sent to the CM writing block 346. In this case, since it is not a field that is updated, the FCC-CRC is not created by the FCC creating block 345 and the FCC-CRC that is stored in a field in the cache data is used.

After steps S107, S109, S111, and S113, the data reading block 343 makes a judgment of whether the length of data read is a length of the logical block or not (step S114). If the length of the data read is not the length of the logical block (No at step S114), the process returns to step S105 and steps from step S105 onward are repeated till the length of the data read becomes the length of the logical block. If the length of the data read is the length of the logical block (Yes at step S114), the CM writing block 346 assembles only the half logical block in the second half based on an arrangement while writing the data in the cache memory 32 by using the data sent to the CM writing block 346 at steps S107 or S111, the FCC-CRC created at step S109, and the BCC-CRC created at step S113. In other words, the update field and the field that is not updated only for the half logical block in the second half are assembled one by one, the FCC-CRC created at step S108 is written in the backmost portion of the field-writing block in which the backmost portion of the update field is stored and the BCC-CRC created at step S112 is added to the backmost portion for each logical block. At this time, writing is performed such that not more than one field is included in one field-writing block. Moreover, data in the CKD format is written in data that is managed by the fixed-length format, according to the arrangement of managing the data in the cache memory 32 such as while writing a different record in continuation with a certain record, the next record is written from the front end of the half logical block.

The CM writing block 346 performs the writing upon transferring the half logical block in second half that is assembled (step S116). After this, the CM writing block 346 makes a judgment of whether the writing of the data of the logical block that includes the content to be updated is terminated or not (step S117). If the writing of the data to the cache memory 32 is not yet terminated (No at step S117), the process returns to step S105 and the steps from step S105 onward are repeated. If the writing of the data to the cache memory 32 is terminated (Yes at step S117), The CM writing block 346 sends a notification of the termination of data transfer to the descriptor reading block 336. The CM writing block 346 also notifies to the MPU chip set 310 by interruption that the process of the descriptor 620 for data writing is terminated and the ReadModifyWrite process of the update data to the cache memory 32 ends.

Thus, according to the second embodiment, for data having invariable content before and after the ReadModifyWrite process in the management of the cache memory 32, the data is not written in the cache memory 32 and only the BCC is calculated. This enables to reduce a load exerted on the protocol DMA chip 330 in the ReadModifyWrite process.

An example of a case is given above in which the cache memory stores the logical block of fixed length 512 bytes and the data is written in units of half logical block of 256 byte. However, this is just one example and the length of the fixed-length data may be any length selected voluntarily. Moreover, unit for writing data in the cache memory can be set to any length voluntarily and more than one writing unit may be allowed to exist in on fixed-length data. In such a case, for performing the ReadModifyWrite process according to the second embodiment, the process may be performed by dividing into two cases, viz. a case in which the update data is included in a writing unit that includes the backmost portion of the fixed-length data and a case in which the update data is not included in the writing unit that includes the backmost portion of the fixed-length data.

According to the present invention, while performing a reading process on data of which one whole field is not updated during updating of the data, even if the check by the field-checking code is correct, there is an error in the block-checking code. Therefore a fault in which the whole field is not updated can be detected. Similarly, a fault in which the whole of fixed-length data could not be updated can be detected as well. As a result, there is a further improvement in reliability of data that is stored in a memory for data storage.

While performing the reading process on data of which the one whole field was not updated during updating of the data, even if the check by the field-checking code is correct, there is an error in the block-checking code. Therefore, the fault in which the whole field is not updated can be detected. Similarly, the fault in which the whole of fixed-length data could not be updated can be detected as well. As a result, there is a further improvement in reliability of the data that is stored in the memory for the data storage. Furthermore, for performing a writing process of data that is not an update field, a calculation of the field-checking code is omitted by using data subjected to updating. Therefore, it is possible to shorten time for an updating process of data as compared to time in a case of updating by using the whole update data.

According to the present invention, if there is a fault such that data that is updated before in the memory for data storage was not updated in units of fields or in units of length of the fixed data, it is possible to detect this fault.

According to the present invention, when a field writing unit that includes an update field, includes an end portion of the fixed-length data, instead of writing data of the field writing unit that includes a invariable field before and after an update of records, in the memory for data storage, only field writing unit that includes the update field is let to be written in the memory for data storage. This enables to shorten time for the update process of data as compared to that in a case where the data is updated by using all the update data.

Moreover, in the case of the check code that is calculated according to a position of attaching the check code, a fault in which the overall field or the overall fixed-length data is not updated cannot be detected. However, by using a check code that is calculated by using overall information included in the field or overall information that is included in the fixed-length data, it is possible to detect a fault in which the overall field or the overall fixed-length data was not updated. This enables to further improve the reliability of the data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of writing data to a cache memory, comprising:
   receiving a record including a plurality of variable-length fields;
   generating field check codes for each field of the record received;
   generating block check codes for each fixed-length block obtained when a whole data including the variable-length fields and the field-check codes thereof is divided;
   adding the field-check codes to the variable-length fields of the received record to obtain the whole data;
   dividing the whole data into the fixed-length blocks;
   adding padding data to a resultant block of the dividing that is shorter than half length of the fixed-length blocks, so that the resultant block is extended to the half length and other whole data starts from the halfway point of a fixed-length block;
   adding the block-check codes to the fixed-length blocks; and
   writing the fixed-length blocks to the cache memory after the block-check codes are added.

2. The method of writing data according to claim 1, wherein the field check codes are created by a method of calculation by using all information in the field and the block check codes are created by a method of calculation by using all information in the fixed-length blocks.

3. The method of writing data according to claim 1, further comprising:
   reading a target data from the cache memory, the target data including a record subjected to updating to the received record wherein
   generating the field-check code for an updated field of the received record by an FCC generating unit; and
   generating the block-check codes by a BCC generating unit for each fixed-length block that is obtained when a whole data including the updated field, the field-check code generated by the FCC generating unit, and a non-updating field of the target data is divided.

4. The method of writing data according to claim 3, wherein
   performing an error-check for every fixed-length data block or for every field of the target data; and
   canceling writing the fixed-length blocks to the cache memory when an error is detected.

5. The method of writing data according to claim 3, wherein the FCC generating unit generates the field-check codes for a count field, a key field, and a data field of the received record of a CKD format.

6. The method of writing data according to claim 3, wherein the BCC generating unit generates the block-check code for a fixed-length block including the padding data or the part of the other whole data.

7. A channel adapter that controls writing data to a cache memory, comprising:
- a receiving unit that receives a record including a plurality of variable-length fields;
- an FCC generating unit that generates field-check codes for each field of the received record;
- a BCC generating unit that generates block-check codes for each fixed-length block that is to be obtained when a whole data including the variable-length fields and the field-check codes thereof is divided; and
- a writing unit that adds the field-check codes to the variable-length fields of the received record to obtain the whole data, divides the whole data into the fixed-length blocks, adds the block-check codes to the fixed-length blocks, and writes the fixed-length blocks to the cache memory after adding the block-check codes,
- wherein the writing unit adds padding data to a resultant block of dividing that is shorter than half length of the fixed-length blocks, so that the resultant block is extended to the half length and other whole data starts from the halfway point of a fixed-length block.

8. The channel adapter according to claim 7, further comprising a reading unit that reads a target data from the cache memory, the target data including a record subjected to updating to the received record, and wherein
- the FCC generating unit generates a field-check code only for an updated field of the received record; and
- the BCC generating unit generates block-check codes for each fixed-length block that is to be obtained when a whole data including the updated field, the field-check code generated by the FCC generating unit, and a non-updating field of the target data is divided.

9. The channel adapter according to claim 8, wherein
- the reading unit performs an error-check for every fixed-length block or for every field of the target data; and
- the writing unit cancels writing the fixed-length blocks to the cache memory, when an error is detected by the reading unit.

10. The channel adapter according to claim 7, wherein
- the FCC generating unit generates each field-check code by a method of calculation by using all information in a corresponding field; and
- the BCC generating unit generates each block-check code by a method of calculation by using all information in each corresponding fixed-length block.

11. The channel adapter according to claim 7, wherein the FCC generating unit generates the field-check codes for a count field, a key field, and a data field of the received record of a CKD format.

12. The channel adapter according to claim 7, wherein the FCC generating unit generates the block-check code for a fixed-length block including the padding data or the part of the other whole data.

13. A channel adapter, comprising:
- a receiving unit receiving a record that includes a plurality of variable-length fields;
- an FCC generating unit generating field-check codes for each field of the received record;
- a BCC generating unit generating block-check codes; and
- a writing unit that adds the field-check codes to the variable-length fields of the received record to obtain a whole data, divides the whole data into the fixed-length blocks, adds the block-check codes to the fixed-length blocks, and writes the fixed-length blocks to a cache memory after adding the block-check codes,
- wherein the writing unit adds padding data to a resultant block of dividing that is shorter than half length of the fixed-length blocks, so that the resultant block is extended to the half length and other whole data starts from the halfway point of a fixed-length block.

* * * * *

UNITED STATES PATENT AND TRADEMARK OFFICE
CERTIFICATE OF CORRECTION

PATENT NO.        : 7,480,850 B2
APPLICATION NO. : 11/085540
DATED             : January 20, 2009
INVENTOR(S)       : Nina Arataki et al.

Page 1 of 1

It is certified that error appears in the above-identified patent and that said Letters Patent is hereby corrected as shown below:

Column 20, Line 16, change "FCC" to --BCC--.

Signed and Sealed this

Twenty-fourth Day of March, 2009

JOHN DOLL
*Acting Director of the United States Patent and Trademark Office*